Figure 1:
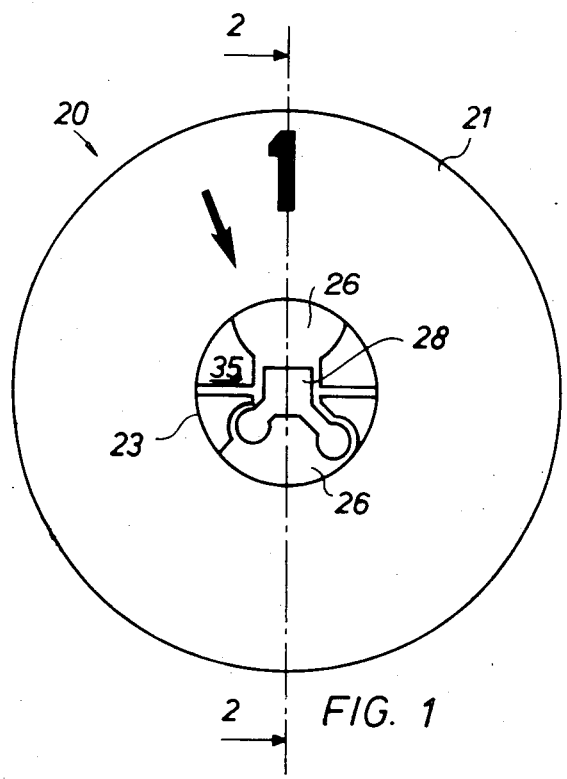

United States Patent [19]

Adriaensen et al.

[11] Patent Number: 4,809,923
[45] Date of Patent: Mar. 7, 1989

[54] LIGHT-TIGHT FILM REEL

[75] Inventors: Victor A. Adriaensen, Berchem; Edward Buelens, Kontich; Carolus C. Goossens, Berchem, all of Belgium

[73] Assignee: AGFA-Gevaert N.V., Mortsel, Belgium

[21] Appl. No.: 890

[22] Filed: Jan. 6, 1987

[30] Foreign Application Priority Data

Jan. 10, 1986 [EP] European Pat. Off. ........ 86200035.3

[51] Int. Cl.⁴ ............................................. B65H 75/28
[52] U.S. Cl. ...................................... 242/71.8; 242/74; 242/74.1
[58] Field of Search ...................... 242/71.8, 74, 74.1, 242/74.2, 125.1; 352/78 R

[56] References Cited

U.S. PATENT DOCUMENTS

| | | | |
|---|---|---|---|
| 1,095,723 | 5/1914 | Frisoli | 242/74 |
| 1,649,470 | 11/1926 | Hayden | 242/74 |
| 2,107,530 | 2/1938 | Goldberg | 242/74 |
| 2,946,533 | 7/1960 | Johnston | 242/74.1 |
| 3,128,959 | 4/1964 | Pelson | 242/74 |
| 3,220,664 | 11/1965 | Whitnah | 242/74.1 |
| 3,715,088 | 2/1973 | Rissberger | 242/74 |
| 4,213,578 | 7/1980 | Katata | 242/74 |

Primary Examiner—Stuart S. Levy
Assistant Examiner—Steven M. DuBois
Attorney, Agent, or Firm—William J. Daniel

[57] ABSTRACT

A light-tight film reel which is positionable on a spindle having a driving connection for rotating said reel, comprising a cylindrical hub-core assembly which includes a central bore in the core for locating the reel on the spindle, at least one separate cavity isolated from the bore disposed between the bore and the periphery of the hub, at least one film threading axial slots in the hub periphery that communicates with the cavity and an axially displaceable film locking member fitting within the cavity.

3 Claims, 4 Drawing Sheets

U.S. Patent    Mar. 7, 1989    Sheet 1 of 4    4,809,923

LIGHT-TIGHT FILM REEL

The present invention relates to a light-tight film reel and more in particular to a universal light-tight film reel for use in library microfilm systems, that is reversibly positionable on a spindle for use in conjunction with various types of photographic apparatus, such as copy cameras and film readers/printers, developing or processing apparatus, etc.

Light-tight film reels on which a film strip can be stored or wound with the emulsion side thereof wound towards or away from the core and with either side flange facing the driving connection so that the reel is usable interchangeably with various types of photographic apparatus, are known.

Such reels comprise a first light-tight side flange, a second light-tight side flange spaced from the first flange and a cylindrical core disposed between both flanges, the core including a first and a second end wall that are disposed near said respective first and second flanges, the end walls being provided with a central opening for engaging a spindle and locating said reel therealong, an inner surface that circumscribes the central opening for engaging the spindle, a plurality of cavities disposed between the central opening and the peripheral wall of the core and extending from the first and second end walls into the core and terminating at an opposite one of the respective first and second end walls, and at least one axial slot in the core wall for the introduction of a film in at least one of such cavities.

In a commonly used reel, the inner surface of the central opening is a square surface, and the first and second end walls are provided with a first opening including a circular terminal portion communicating by a radial keyway with the central opening, and a second opening including likewise a circular terminal portion communicated by a radial keyway with the central opening, said second opening being located at a greaer distance from the reel axis than the first opening.

A universal film reel of the described type is disclosed in U.S. Pat. No. 3,330,494. A difficulty with this reel, as well as with all other similar reels that are currently used, is the way of securing the trailing end of the strip of film to the core of the reel, prior to the winding of the film. In the description of the present specification, the term "trailing end" is used to denote the end of the film strip that is secured to the core, this as distinct from the other end of the film which occupies the outer winding on a roll of wound film, and which is referred to as "leading".

According to one known procedure, the trailing end of the film strip is not fixedly secured to the core. The operator inserts the film end into the slot of the core, and then endeavours to keep the film end engaged into the slot while rotating the reel over a few revolutions until the first film windings become sufficiently tightened to ensure the further pulling of the film as the reel spindle becomes driven. Practice shows that this manipulation frequently ends unsuccessfully, since the cavity in the core mostly does not accept a film length longer than approximately 15 mm, so that it requires special attention from the operator to maintain the end of the film in said cavity during the first revolutions of the reel in order to produce the first film windings. The described threading up of the film in the reel must be done at the instance the freshly exposed film leaves the processing machine for the photographic development of the film, and at each occurrence the trailing end of the film is withdrawn from the film spool on a film reader.

According to another procedure, the leading end of the film strip is fixedly secured to the core of a film reel. To that end, the operator inserts the film end into the slot of the core, and then inserts a suitable locking member in the form of a rectangular or otherwise shaped elastic piece into the cavity of the core in order to clamp the film end between such locking member and a corresponding wall section of the cavity. A sufficient insertion of the film end into the cavity is required, in order that a good grip on the film is obtained. The procedure raises minor problems in the case of a film reader or printer, but major problems in the case of a film processor, where the operator has only a few seconds available to accomplish the operation successfully since the film leaves the processor at a speed situated approximately between 2 and 12 cm/s. Once a film "spaghetti" has been produced as a consequence of delayed winding up, damaging of the developed film images is almost unavoidable.

Furthermore, the technique of securing the film to the core by clamping the film by means of a locking member is not completely reliable since it happens that at increased film tensions, which are far below the breaking strength of the film, the trailing film end becomes withdrawn from the core.

A further problem relating to this mode of engagement of the film to the reel, is that detachment of the film from the reel is difficult since in practice it is not easy to remove the locking member from the reel. In practice use is made of either any sharp-pointed member for prying the locking member from the cavity, or a special tool that may be screwed into, or otherwise engages with the locking member in order to pull it out of the cavity of the core. Such detachment must occur when e.g. the film reel has been damaged and must be replaced by a new one, or when the film will be discarded and it is desired to recover the film reel.

It is the aim of the present invention to provide an improved light-tight film reel that allows the trailing end of a strip of film to be readily secured to the core of the reel, either in a fixed way, releasably as the case may be, or in a non-fixed way, according to different techniques.

According to the present invention, a light-tight film reel positionable on a spindle having a driving connection for rotating said reel, comprising a first light-tight side flange, a second light-tight side flange spaced from said first flange and a cylindrical hub core assembly disposed between said flanges, the core being joined to the hub by including a first and a second end wall and defining a central opening for engaging said spindle and locating said reel therealong, a plurality of cavities disposed between said central bore and the peripheral wall of said hub and extending axially between said first and second end walls through said core, and an axial slot in the said peripheral hub wall for the introduction of a film in one of such cavities, is characterised thereby that said axial slot is provided in the hub wall near one angular end of said one cavity, a second axial slot is provided in the hub wall near the opposite angular end of said one cavity, and the inner wall that defines said cavity extends smoothly and uninterruptedly from one slot towards the other slot.

The new film reel shows the essential feature that the trailing end of the film can be threaded up in the reel in such a way that the film end is passed through both slots of the hub in succession, and then reappears from the hub and can take there a length that may range from some centimeters to some decimeters. Any uncontrolled withdrawal of the film during the formation of first windings of film on the reel is unimportant, as long as such displacements are smaller than the "reserve" length of film that protrudes from the core.

A further advantage of the new reel is that the cavity with the two slots may be readily formed in such a way that the film follows a path that runs approximately centrally of said cavity. Such position of the film in the cavity allows the use of an improved film locking member that engages the film between two legs, and the locking effects of which is based on a rotation of the member about its axis whereby clamping of the film is effected between the member and a corresponding section of the wall of the cavity, and/or between the legs of the member.

According to another application of the film reel according to the invention, the trailing film end may be permanently secured to the hub of the reel by securing the extremity of the outgoing portion of the trailing end of the film to the adjacent film portion in the form of a closed loop. Such securing may occur by means of adhesive, by means of a self-adhesive tape, by heat-sealing, etc.

According to a preferred embodiment of the invention, the interior wall of the cavity incorporating the two slots has a cylindrical curvature, and said curvature is larger than the curvature of the wall portion of the hub. In this way, a smooth passage is obtained for the trailing end of the film from one slot to the other upon the threading of the film, and also a sufficiently wide cavity is obtained so that a locking member may be used, which has a further leg, spaced in parallel from the first two legs, in order to lock the member against rotation after it has engaged the film.

Figure 2:
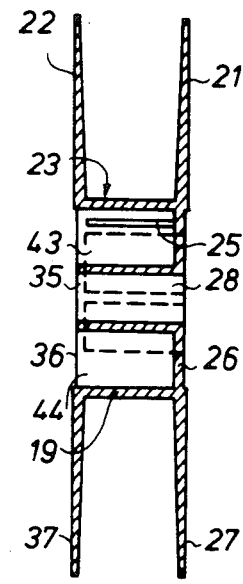
Figure 3:
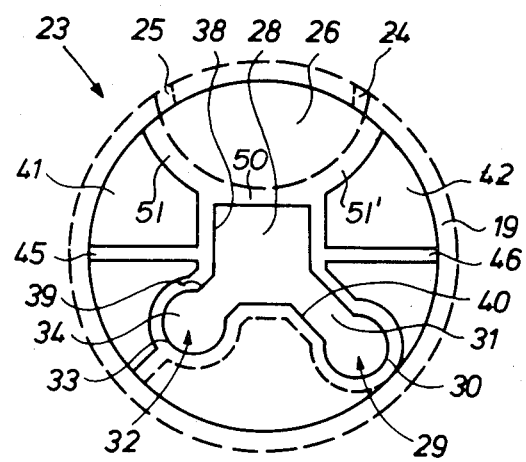
Figure 4:
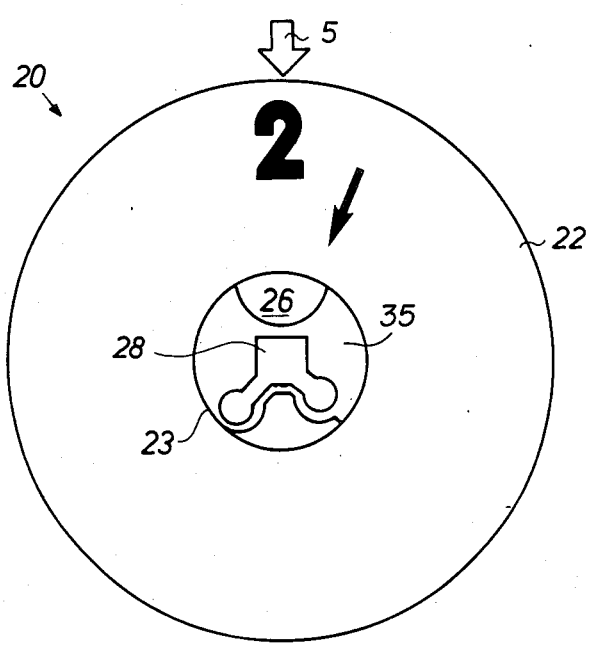
Figure 5:
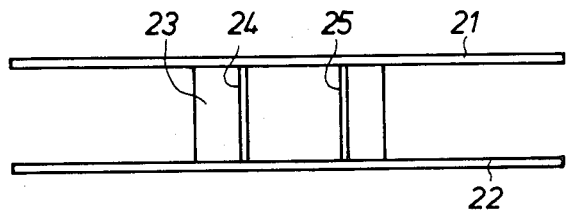
Figure 6:
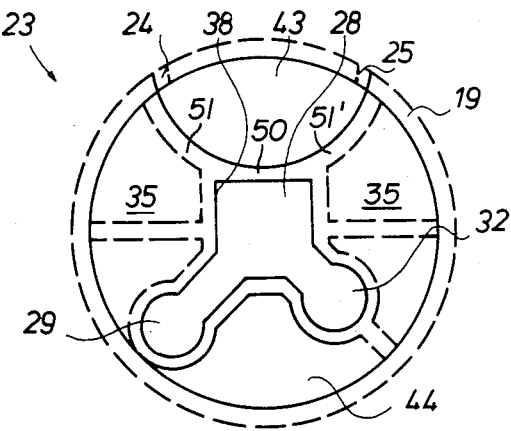
Figure 7:
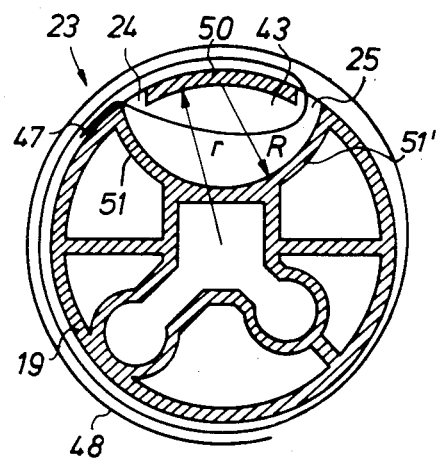
Figure 8:
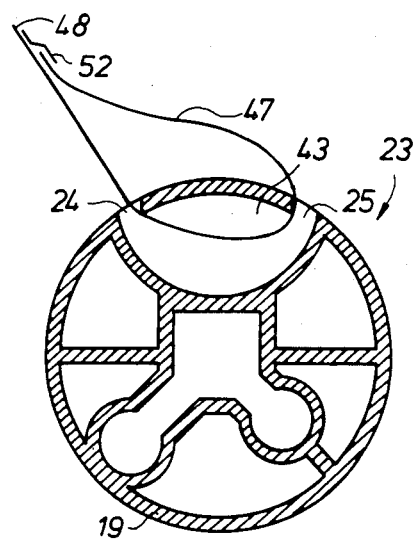
Figure 9:
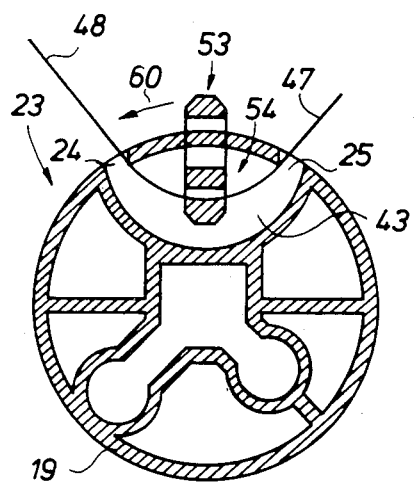
Figure 10:
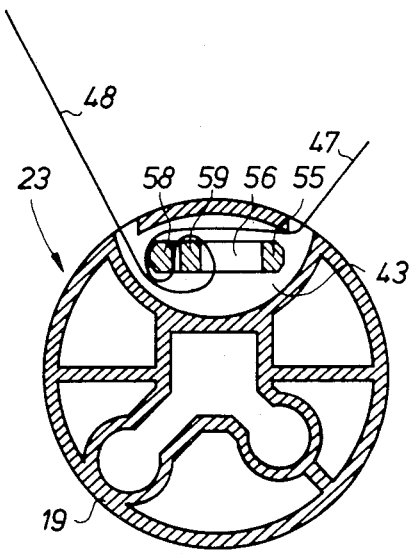
Figures 11, 12:
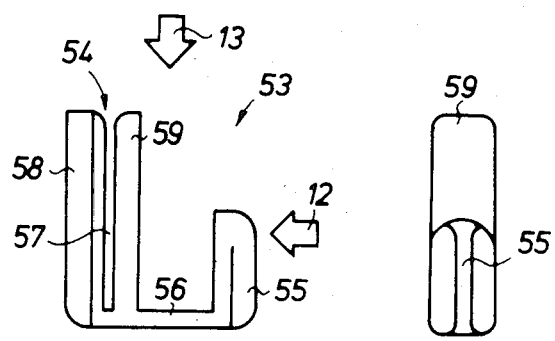
Figures 13, 15:
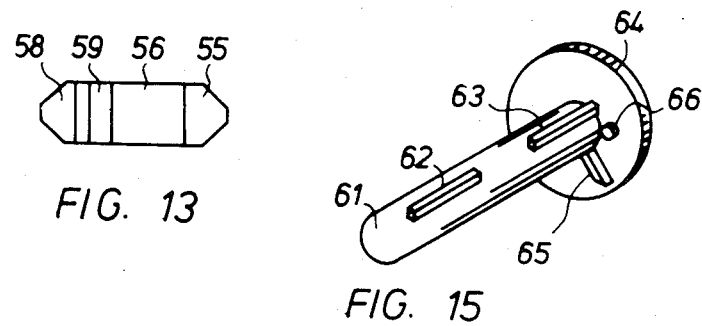
Figure 14:
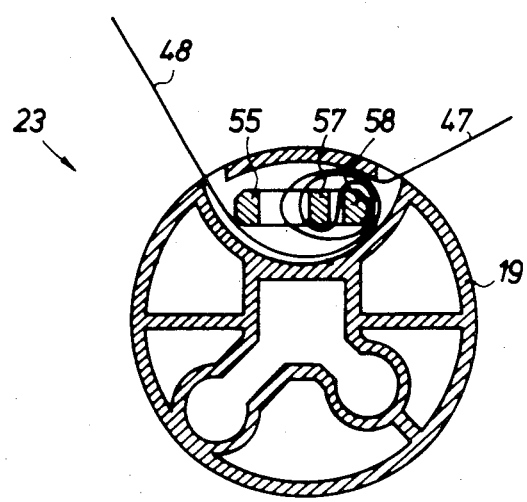

The invention will be described hereinafter by way of example with reference to the accompanying drawings wherein:

FIG. 1 is a side view of one face of one embodiment of a reel according to the invention, showing the location of the openings and cavities therein, FIG. 2 is a sectional view on line 2—2 of FIG. 1, FIG. 3 is an enlarged side view of the hub core assembly of FIG. 1, FIG. 4 is a side view of the other face of the reel showing the location of the openings and the cavities in the assembly, FIG. 5 is an end view of the reel according to the arrow 5 of FIG. 4, FIG. 6 is an enlarged side view of the hub core assembly of FIG. 4, FIG. 7 is a cross-sectional view of the hub of the reel, showing a first embodiment of the securance of the trailing end of a film strip to the reel, FIG. 8 is a cross-sectional view of the hub of the reel, showing a second embodiment of the securance of the trailing end of a film strip to the reel, FIGS. 9 and 10 are a cross-sectional view of the hub of the reel, showing a third embodiment of the securance of the trailing end of a film strip to the reel, FIG. 11 is a side view of a locking member for the securance of the trailing film end to the hub core assembly according to the third embodiment, FIG. 12 is an end view of the locking member according to the arrow 12 of FIG. 11, FIG. 13 is a top view according to the arrow 13 of FIG. 11, and FIG. 14 is a cross-sectional view of the core of the reel, showing another embodiment of the securance of the film to the reel, by means of a locking member as illustrated in FIGS. 11 to 13, FIG. 15 is a perspective view of one embodiment of a spindle showing relative locations of various driving connections thereon.

Referring to FIGS. 1, 2, 4 and 5, a light-tight film reel 20 is shown as comprising a pair of axially spaced annular flanges 21 and 22 and a cylindrical hub 23 that is disposed between the flanges and arranged concentric therewith. The hub is provided with two axially extending slots 24 and 25 at peripherally spaced points in its wall 19 for enabling an end of a film strip to be passed through the hub. The reel is molded or otherwise fabricated as a single unit from any thermoplastic or thermosetting material, or die cast in one piece from various metal alloys. The reel is made from a light-opaque material.

The flanges of the reel may at their outer surfaces be provided with identification marks such as the numerals 1 and 2, and corresponding arrows pointing to either one of the two slots.

Referring to FIGS. 1, 2, 3 and 6, an interior core 38 is rigidly supported within the hub 23 in part by way of opposite connecting end wall sections 26 and 35 which have their outside surfaces slightly recessed with respect to the corresponding outer surfaces 27 and 36 of the annular flanges 21 and 22. The core defines a central bore 28 which is of generally square shape in cross section for driving engagement with a driven spindle. Opening radially outwardly from two adjacent corners of the bore 28 are first and second recesses 29 and 32. These recesses have generally round outer ends 30, 33, which are located at radially different distances from the bore axis, the ends being in communication with the bore through keyways 31, 34. The recesses pass axially through the reel, as does bore 28, and are bounded by walls designated 39, 40 which are extensions of the walls of core 38.

Between the core 38 and hub 23 on diametrically opposite sides thereof adjacent radial recesses 29, 32 are open spaces or cavities 41, 42 (see especially FIG. 3) each of which is partitioned by a radial rib 45, 45' which bars accidental penetration into the cavities by the driving spindles and also gives support to core 38. The cavities can be closed at one axial end by a portion of end wall 35 and left open at the other end by wall 26.

Also situated between the hub and core on diametrically opposite sides in orthogonal relation to cavities 41 and 42 are cavities 43 and 44 (see especially FIG. 5). Cavity 44 is limited along with a section of the hub by the walls of recess 29, 32 plus a short rib joined to the radially shorter recess 32. On the other hand, cavity 43 is bounded by an arcuate section of the hub wall, the side (designated 50 for clarity) of the square core 38 which is generally opposite recesses 29, 32, plus generally radially directed extensions 51, 51' stretching from the ends of such core side 50 to the hub wall. The section of hub wall 38 for cavity 43 is penetrated by two peripherally spaced apart axially extending film threading slots 24, 25 which open into the interior of cavity 43 preferably at its peripheral limits, i.e., proximate the outer ends of wall extensions 51, 51'.

The trailing film end can be introduced into the cavity 43 through either of hub slots 24, 25 and then passed out through the other of such slots, the axial dimension of cavity 43 being essentially equal to the width of the reel between the side flanges and thus allowing free movement of the film end therein. One axial end opening of cavity 43 is unobstructed by end wall 35 so that any length of film inside the cavity is accessible through this unobstructed opening while the other end opening thereof is closed by end wall 26.

Preferably, the surfaces of core wall side 50 and extensions 51, 51' bounding the inner side of cavity 43 join smoothly without discontinuities and can preferably be curved about a common radius R (see FIG. 7).

Different techniques of attaching the trailing end of a film strip to the reel are now described with reference to FIGS. 7 to 10 which show a cross-sectional view of the hub core assembly of the reel according to FIGS. 1 to 6.

Referring to FIG. 7, the trailing end of a strip of film 48, is inserted by the operator in succession through the slots 25 and 24 until a length 47 of film ranging between a few centimeters and some decimeters extends from the slot 24. The insertion of the film in the slot 25 follows an almost radial path in the spool and may be facilitated by providing the film with a tapered end, such as by cutting away a wedge-like portion from one or both lateral ends of the film. The cross-over of the film from the slot 25 to the slot 24 does not causes any problem because both the side wall section 50 of the core and the radial extensions wall 51, 51' are smoothly concaved curved. Even films that have a badly cut extremity, or films with a strong curling tendency or a deformed end portion are threaded into the reel without any problem. The image-bearing side of the film may face the core or it may face away from the core, depending on the later use of the wound film reel.

The curvature of the inward wall 50, 51, 51' of the cavity is important in the guidance of the film through the cavity. It has been shown that a curvature of said wall which is smaller than the curvature of the hub wall, or in other words a radius of curvature R that is smaller than the radius r, is conducive to a ready and quick threading of the film.

After the film has been inserted through the slots as described from the right-hand towards the left-hand side of the figure as illustrated, the film 48 is folded back at the slot 25, and wound on the in anti-clockwise direction as illustrated. The risk for the trailing end of the film to become withdrawn from the slots during the formation of the first film windings on the hub is virtually zero, since after the film end 47 has been engaged by the beginning of the first film winding, said end is clamped between such winding and the outer hub surface.

In case winding of the film in clockwise direction on the hub is required, threading of the film can occur successively through slots 24 and 25.

Further it should be understood that folding back of the film must not necessarily occur at the slot where the film enters threading the cavity, but may as well occur at the slot where the trailing film end leaves the cavity. Referring to FIG. 7, and the threading up of the film being as illustrated, the film is wound clockwise about the hub instead of anti-clockwise, and after approximately one winding has been made, the film end 47 extending from the slot 24 is bent clockwise or towards the right-hand side so as to become engaged between the second and the first film winding on the core. Clamping of the film end in this way is as effective as the film clamping illustrated in FIG. 7.

It is clear that the securance of the film as described hereinbefore is not permanent, since upon complete unwinding of the spool, the film is withdrawn entirely from the core.

Referring to FIG. 8, the trailing end 47 of a film which has been threaded through the slots 24 and 25 of the hub, is folded back and secured to the film 48 by means of a piece of self-adhesive tape 52. It is clear that the attaching to form a closed loop in the film can also occur in other ways, such as by the use of a two-side self-adhesive tape that is stuck between the film surfaces facing each other, by a heat-sealed film connection, etc. The film which is secured to the hub in the described way, can be wound in either direction on the hub. The film securance is in principle permanent, unless the connection at 52 is broken by the operator.

A film securance wherein use is made of a separate locking member that can suitably co-operate with the threading cavity between the two film insertion slots, is described hereinafter with reference to FIGS. 9 to 14.

Referring to FIGS. 11 to 13, a film locking member 53 is illustrated that comprises a longer and a shorter pin or stud, 54 resp. 55, that are interconnected in laterally spaced parallel relationship by a flat portion 56. The stud 54 is forked over most of its length, i.e., has an axial slot 57 whereby two legs 58 and 59 are formed. The mutually facing end walls of both legs are tapered outwardly as shown in the figures to give a flared entrance to the slot 57.

The locking member may be molded or otherwise fabricated from any thermoplastic or thermosetting plastics, or die cast from various metal alloys.

The operation of the locking member is as follows, with reference to FIGS. 9 and 10. The trailing end 47 of a strip of film being threaded through the slots 24 and 25 as shown, the locking member is introduced, with its film clamping stud 54 into the cavity 43 in a direction about parallel with the axis of the reel.

Although the film may take different positions in the cavity threading 43 depending on the stiffness or the curling of the film, the direction of the incoming film in the slot 24 and the skill of the operator, there is left in any way so much clearance space at both sides of the film in the cavity, that the two legs or forks 58 and 59 of the stud may be slipped axially into the cavity without any difficulty on opposite sides of the film. The flared entrance to the slot 57 between of the two legs of the stud perform in this connection a "searching" function for the film whereby the film may be very easily engaged by the legs of the locking member, even by an unskilled operator. The locking member is axially introduced into the threading cavity over less than about half its length so that the shorter stud 55 remains free beyond the plane of the corresponding flange of the reel. The locking member is then rotated, see the arrow 60, by the operator about an imaginary axis that is approximately the axis of the longer stud 54, and this rotation continues over approximately 270 angular degrees, so that the film becomes wrapped or threaded on the inserted half of the stud 54. The locking member is then further displaced axially into the cavity by the operator until it takes approximately a position as shown in FIG. 10, and finally inserted completely into the cavity until its bridge portion 56 lies flush with the end wall of the core. The short or locking stud 55 is held against unwinding by the corner portion of the cavity 43 which is opposite to the corner portion where the leg 58 is situated, prevents unwinding of the locking member.

In the illustration of FIG. 10 there has been left some clearance space between the studs of the locking member and the corresponding wall sections of the cavity, in order to clearly show the path of the film about the legs of the member. In practice, the film is firmly urged by the longer stud, and occasionally also by the shorter stud, against the corresponding wall of the cavity whereby the film becomes tightly clamped in the reel. Furthermore, the elasticity of the legs 58, 59 of the stud 54 may be such that the legs are biased together by the tension created by the wound film so that also in this way an effective clamping of the film is obtained. It has been shown that the described way of attaching the film to the reel is extremely strong and withstands any accidental forces may occur for instance on a programmed film reader where the unwinding of the film reel becomes abruptly arrested when the setting of the number of film frames on the apparatus is larger than the number of film frames that are actually available on the film on the unwinding reel.

The attaching of the film to the hub may be easily undone, since the portion 56 of the locking member can be easily engaged with a fingernail or the like and lifted axially from the cavity of the hub. The locking member may be re-used an unlimited number of times.

FIG. 14 illustrates the case that the locking member is rotated over approximately 450 angular degrees in order to secure the film. This may be required in case a still stronger film attachment than the one which is illustrated in FIG. 10 is required, but this may also be very practical in case it is desired to use only one type of locking member for the attaching of film of different thicknesses.

Referring specifically to the examples described hereinbefore, a reel in accordance with FIGS. 1 to 6 and 10, was provided with a roll of 30 m of 16 mm film with a thickness of 0.13 mm for microfilming purposes.

Referring to FIGS. 1 to 6 and 14, the reel was provided with a roll of 30 to 60 m of 16 mm film with a thickness of 0.06 mm, likewise for microfilming purposes. The film was secured to the hub by means of the same locking member as that used for the locking of the FIG. 10 example.

FIG. 15 illustrates one embodiment of a driving spindle onto which a film reel may be positioned. The spindle 61 can be cylindrical or square with a cylindrical end, and provided with any one of a number of different driving connections that are located in different positions relative to the spindle. Key 62 is shown as being located inwardly from the outer end of the spindle and key 63 is shown as being positioned at the end of the spindle and adjacent to a flange 64 that is integral with the spindle. A key 65 is shown as being radially arranged on the flange 64, whereas a pin 66 is fixed to the flange and displaced radially from the spindle 61.

The presence of a second slot in the hub of the reel does not destroy the light-tightness of the reel to an extent greater than does one slot only. As a matter of fact, the light-tightness of the inner peripheral side of the reel is based on the absorption of the light entering through the slots by the inner film windings.

The light-tightness of the outer peripheral side of the reel is established as known in the art by the provision of an opaque leader to the light-sensitive film that tightly fits between the inner faces of the flanges of the reel.

A reel according to the invention that is provided with a roll of light-sensitive film may further be protected against the influences of light, moisture and mechanical loads, by wrapping the reel in an appropriate wrapping foil, or by placing the reel in a rigid box, preferably a rectangular plastic box with an integrally moulded lid, as used in the art. Suchlike box can serve as a light-proof permanent storage box as standard packaging for different types of films, but the box can also be used for the keeping of a processed film reel.

It will be understood that a reel according to the present invention is not limited to the described embodiment.

The reel may have first and second openings, slots and keyways that differ from the illustrated ones.

The configuration of the openings, the interconnecting walls, and the cavities of the core-hub-assembly may be identical at both sides. This means that a reel may be provided with two opposite threading cavities with two film threading slots each.

We claim:

1. A film reel adapted to be positioned on a spindle having a driving connection for rotating said reel, comprising two axially separated generally annular side flanges joined by a cylindrical tubular-walled hub having its opposite end edges affixed to the inner margins of the respective side flanges for winding of a length of film thereon between said side flanges, a core rigidly mounted within said hub and defining an irregularly-shaped bore coaxial with said hub for driving telescoping engagement with the driving spindle, curved wall means extending interiorly of the hub smoothly and without interruption between the opposite ends of an arcuate section of the hub wall and defining with said arcuate section a threading cavity located between the core and the arcuate hub wall section and separated by the curved interiorly extending wall means from the core bore and the adjacent interior space between the core and hub, the radius of curvature of said curved wall means being shorter than the radius of said hub wall, said threading cavity being elongated in the peripheral direction of said hub and axially accessible through an axial end opening, and two opposed film-threading slots passing through the hub wall at the peripherally spaced apart limits of said arcuate section thereof and opening into said threading cavity substantially flush with the ends of said interiorly extending wall means, whereby a terminal length of film can be passed through said threading cavity by way of said hub wall slots with the portion within said cavity being accessible through said axial end opening, and forked film-engaging means insertable through said axial end opening in straddling relation to the thus accessible film portion within said cavity.

2. A film reel-locking pin assembly adapted to be positioned on a spindle having a driving connection for rotating said reel, comprising two axially separated generally annular side flanges joined by a cylindrical tubular-walled hub having its opposite end edges affixed to the inner margins of the respective side flanges for winding of a length of film thereon between said side flanges, a core rigidly mounted within said hub and defining an irregularly-shaped bore coaxial with said hub for driving telescoping engagement with the driving spindle, wall means extending interiorly of the hub smoothly and without interruption between the opposite ends of an arcuate section of the hub wall and defining with said arcuate section a generally elongated threading cavity located between the core and the arcuate hub, said threading cavity being axially accessible through an axial end opening in said hub, two opposed film-threading slots passing through the hub wall at the peripherally spaced apart limits of said arcuate section thereof and opening into said threading cavity substantially flush with the ends of said interiorly extending wall means, whereby a terminal length of film can be passed through said threading cavity by way of said hub wall slots with the portion within said cavity being accessible through said axial end opening, and a film-locking pin insertable into said threading cavity via said axial end opening, said pin being bifurcated over a major part of its length to define an elongated slot for receiving said film when inserted axially into said cavity and being adapted when said film is received in said slot to be rotated about its axia to wrap part of the film within said cavity therearound, said pin having a detent surface thereon spaced axially from its bifurcated end of engagement with a cooperating surface of said cavity when said pin is axially inserted fully into said cavity but free of said engagement when said pin is partially inserted therein with the film partially received within the elongated slot of said pin.

3. The assembly of claim 2 wherein the open end of said slot in said pin is flared outwardly to facilitate reception of said film therein.

* * * * *